United States Patent [19]

Ullman, Jr.

[11] 4,200,956
[45] May 6, 1980

[54] HINGE, HANDLE AND DETENT

[75] Inventor: Myron E. Ullman, Jr., Canfield, Ohio

[73] Assignee: M.M.G., Inc., Youngstown, Ohio

[21] Appl. No.: 892,332

[22] Filed: Mar. 31, 1978

Related U.S. Application Data

[63] Continuation-in-part of Ser. No. 806,698, Jun. 15, 1977.

[51] Int. Cl.² .............................................. E05D 7/04
[52] U.S. Cl. ....................................... 16/130; 16/151; 49/388
[58] Field of Search ................. 16/129, 130, 131, 132, 16/191, 137, 151, DIG. 34, DIG. 40, 147; 49/388

[56] References Cited

U.S. PATENT DOCUMENTS

| | | | |
|---|---|---|---|
| 2,768,715 | 10/1956 | Skannel et al. | 49/460 X |
| 2,781,542 | 2/1957 | West | 16/151 X |
| 2,793,406 | 5/1957 | Focht | 49/460 X |
| 3,137,891 | 6/1964 | Rudnick | 16/151 |
| 3,390,486 | 7/1968 | Walters | 16/147 X |
| 3,866,658 | 2/1975 | Smith | 16/132 X |

FOREIGN PATENT DOCUMENTS

| | | | |
|---|---|---|---|
| 657874 | 2/1963 | Canada | 16/151 |
| 1196541 | 7/1965 | Fed. Rep. of Germany | 16/151 |
| 2524419 | 12/1976 | Fed. Rep. of Germany | 16/137 |
| 1177368 | 12/1958 | France | 16/151 |

Primary Examiner—George H. Krizmanich
Attorney, Agent, or Firm—Burge & Porter Co.

[57] ABSTRACT

A system is provided for pivotally mounting opposed ends of a door panel between a pair of frame or shelf members. The system utilizes a pair of panel-engaging members which have U-shaped cross sections and which receive the door panel ends. Each of the panel-engaging members has a pair of spaced leg portions interconnected by a base portion. A pair of elongate cylindrical projections extends from the base portions to define a pivot axis of the door panel. A pair of projection-receiving formations is provided on the frame members for journaling the projections. At least one of the projection-receiving formations takes the form of an adjustably positioned bearing structure. The panel-engaging members are preferably formed as elongate extrusions of plastics material. One of the panel-engaging members is provided with a handle formation for facilitating movement of the door panel. A first detent element is provided on one of the panel-engaging members and is cooperable with a second detent element carried by one of the frame members. In preferred practice, the first detent element takes the form of a recess provided in the outer surface of the base portion of the one panel-engaging member, and the second detent element is receivable in the recess to releasably retain the door panel in its closed position. In alternate practice, the first detent element takes the form of a magnetic receptor plate secured to a leg portion of the one panel-engaging member and being cooperable with a magnetic catch carried on the one frame member.

35 Claims, 8 Drawing Figures

HINGE, HANDLE AND DETENT

CROSS-REFERENCE TO RELATED APPLICATION

The present application is a continuation-in-part of application Ser. No. 806,698, filed June 15, 1977, entitled FASTENING SYSTEM, referred to here as the "Undercut Slot Patent".

BACKGROUND OF THE INVENTION

1. Field of the Invention

The present invention relates generally to a system for mounting opposed ends of a door panel between a pair of frame or shelf members for pivotal movement of the door panel relative to the frame or shelf members, and, more particularly, to a hinge, handle and detent assembly which is particularly well adapted for use with glass doors of a cabinet.

2. Prior Art

While hinges, handles and detents of various configurations have been used in conjunction with pivotally mounted cabinet door panels, the mounting of such components on cabinet door panels formed from glass has presented a significant problem. One proposal has been to adhere hinge, handle and detent components to inner and/or outer surfaces of the glass door panels. This proposal is undesirable inasmuch as the area of adherence is viewable through the glass and is often unsightly. Moreover, the adhesive bond effective between the components and the glass panels is often not as durable and long-lived as desired.

Another proposal for mounting hinge, handle, and detent components on glass door panels has called for the drilling of holes through the glass and for the insertion of threaded fasteners through the holes to mount the components. This proposal is far more expensive in its requirement that holes be formed through the glass and in its provision of the relatively more complex hardware which is required to prevent glass breakage in the mounting areas. Moreover, this proposal oftentimes results in the formation of stress concentrations in the glass door panels within the vicinity of the holes, whereby the glass is more likely to fail in the vicinities of the component mountings.

The need for a relatively simple system for pivotally mounting opposed ends of a door panel between a pair of frame or shelf members, and, more particularly, the need for such a system as additionally permits hinge, handle and detent components to be inexpensively and yet attractively fastened to glass door panels of a cabinet structure has gone unsatisfied.

SUMMARY OF THE INVENTION

The present invention overcomes the foregoing and other drawbacks of prior proposals by providing a novel and improved, simple and inexpensive system for mounting opposed ends of a door panel between a pair of frame members for pivotal movement of the door panel relative to the frame members. The system is particularly well adapted for use with glass door panels of a cabinet and provides a means by which hinge, handle and detent components can be attractively and securely fastened to a glass door panel.

In accordance with the more basic features of the present invention, a pivotal mounting system is provided which utilizes a pair of panel-engaging members to receive opposed ends of a door panel. Each of the panel-engaging members has a pair of spaced leg portions interconnected by a base portion and each is configured to receive a separate one of the door panel ends between its leg portions. A pair of elongate projections extends from the base portions to define a pivot axis of the door panel. Each of the elongate projections extends from the base portion of a separate one of the panel-engaging members. A pair of projection-receiving formations journals the projections. Each of the projection-receiving formations is provided on a separate one of the frame members and is configured to journal a separate one of the projections to mount the door panel on the frame members for movement about the pivot axis between open and closed positions.

In preferred practice, the panel-engaging members are formed as elongate extrusions of plastics material. The leg portions of each of the panel-engaging members have parts which clampingly engage the door panel end received therebetween. A channel is defined between portions of each of the panel-engaging members and the door panel end received therebetween, and an adhesively coated resilient liner is provided in the channel to shield the associated door panel end and to assist in bonding the components engaged by the liner.

The elongate projections are preferably defined by cylindrical stem portions of a pair of metallic projection-defining members. The projection-defining members have mounting portions which are positioned in the channels of the panel-receiving members. The stem portions of the projection-defining members extend through holes formed in base portions of the panel-engaging members.

A selected one of the panel-engaging members is provided with a handle for facilitating movement of the door panel relative to the frame members. One or both of the panel-engaging members may be provided with a detent element for cooperating with one or more other detent elements carried on the frame members to releasably retain the door panel in its closed position. In preferred practice, the detent element on the panel-engaging member takes the form of a recess provided in the outer surface of the member's base portion. In this instance, a cooperating detent element carried by the frame member is receivable in the recess to releasably retain the door panel in its closed position. In alternate practice, the detent element carried by the panel-engaging member takes the form of a magnetic receptor plate carried by a leg portion of the member, and a cooperating detent element carried by the frame member comprises a magnetic catch which is engagable with the receptor plate to releasably retain the door panel in its closed position.

At least one of the projection-receiving formations is defined by a bearing structure movably mounted on its associated frame member for adjustably positioning the pivot axis of the door panel relative to the associated frame member. The bearing structure is preferably of elongate configuration and has an elongate portion extending into an elongate slot formed in the associated frame member. The elongate slot has an undercut cross section at least a part of its length, and the bearing structure is provided with a mounting system which extends into the undercut part of the slot for releasably clamping the bearing structure in selected positions on the associated frame member. The elongate slot also preferably has a part which is not undercut, and the mounting system is configured to be introduced into the undercut part of the slot by first being inserted into the slot at the location of the non-undercut part and then by being moved longitudinally within the slot to the location of the undercut part.

A further aspect of the system of the present invention includes a method of mounting opposed ends of a door panel between a pair of frame members for pivotal movement of the door panel relative to the frame members. The method includes the step of providing a pair of panel-engaging members, each having a U-shaped cross section defined by a pair of spaced leg portions interconnected by a base portion and each being configured to receive a separate one of the door panel ends between its leg portions. The method further includes the steps of providing a pair of elongate projection means each extending from a separate one of the base portions to define a pivot axis of the door panel, and providing a pair of projection-receiving means each on a separate one of the frame members for journaling a separate one of the projection means. Additionally, the method includes the steps of inserting each of the panel ends between the leg portions of a separate one of the panel-engaging members to interconnect the panel-engaging members and the door panel, and journaling the projection means in the projection-receiving means to pivotally mount the door panel on the frame members.

Other aspects of the method include the steps of forming the panel-engaging members as elongate extrusions of plastics material, providing handle and detent components on the panel-engaging members, and providing the projection-receiving means with an adjustment capability through the utilization of a clamp-type mounting means extending into an undercut slot formed in the associated frame member or members.

As will be apparent from the foregoing summary, it is a general object of the present invention to provide a novel and improved system for pivotally mounting a door panel between a pair of frame or shelf members.

It is a further object of the present invention to provide a novel and improved hinge, handle and detent assembly which is particularly well adapted for use with glass door panels of a cabinet.

These and other objects and a fuller understanding of the invention may be had by referring to the following description and claims taken in conjunction with the accompanying drawings.

DESCRIPTION OF THE PREFERRED EMBODIMENT

Figure 1:
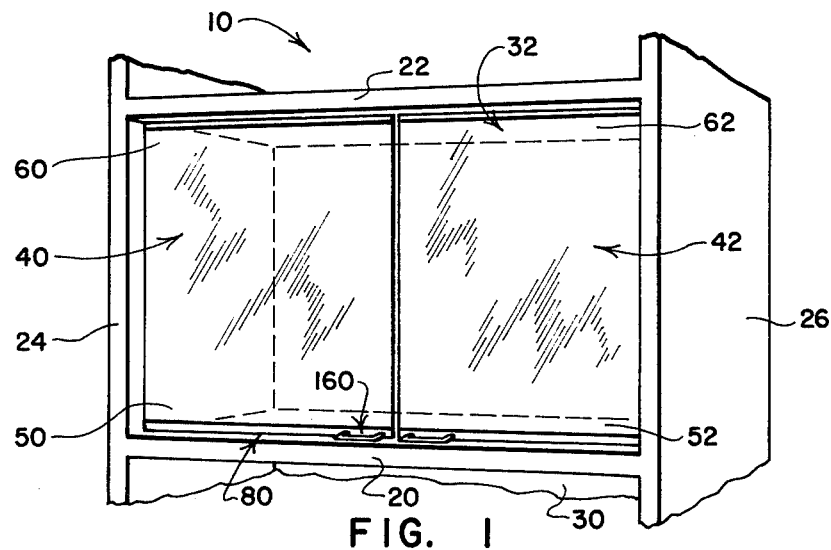
FIG. 1 is a perspective view of a portion of a cabinet showing left and right glass door panels pivotally mounted between shelf members of the cabinet and employing hinge, handle and detent assemblies embodying a preferred practice of the present invention.

Referring to FIG. 1, a cabinet construction embodying the preferred practice of the present invention is indicated generally by the numeral 10. The cabinet 10 includes a pair of lower and upper shelf members 20, 22 which extend between and interconnect a pair of uprights 24, 26. The cabinet 10 has a back 30 which cooperates with the members 20, 22, 24, 26 to define a forwardly facing compartment 32. Left and right glass door panels 40, 42 are provided for selectively opening and closing the front of the compartment 32. The glass door panels 40, 42 have lower end regions 50, 52 and upper end regions 60, 62.

In accordance with the preferred practice of the present invention, systems are provided for mounting the opposed ends 50, 60 and 52, 62 of the door panels 40, 42 between the shelf members 20, 22, for pivotal movement of the door panels 40, 42, relative to the shelf members 20, 22. The mounting systems used to mount each of the door panels 40, 42 are identical with the exception that the system utilized on the left door panel 40 is a mirror image of the system utilized in the mounting of the right door panel 42. Accordingly, only the mounting system utilized in conjunction with the left door panel 40 will be described. Moreover, the components of the system utilized to mount the lower end region 50 of the door panel 40 on the shelf 20 is identical to the mounting system utilized to mount the upper end region 60 of the door panel 40 on the shelf 22. Accordingly, only the mounting system components utilized in the mounting of the lower end region 50 of the left door panel 40 will be described.

Referring to FIGS. 2-5, mounting system components utilized to effect a pivotal connection between the lower end region 50 of the door panel 40 and the shelf 20 include a panel-engaging member 80, a projection-defining member 100, a projection-receiving member 120 and an elongate slot 140 formed in the shelf member 20.

Figure 2:
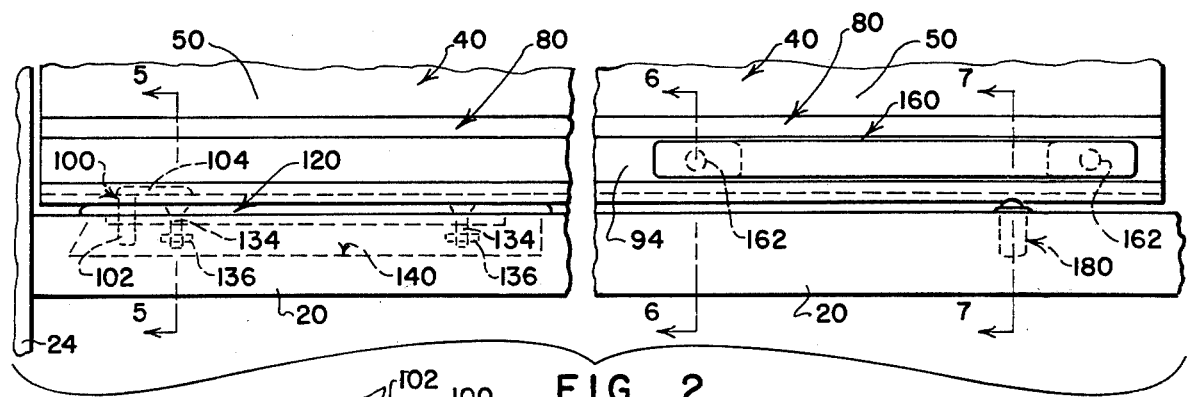
FIG. 2 is an enlarged, foreshortened, front elevational view of portions of the cabinet of FIG. 1 including lower portions of the left glass door panel.
Figures 5, 6:
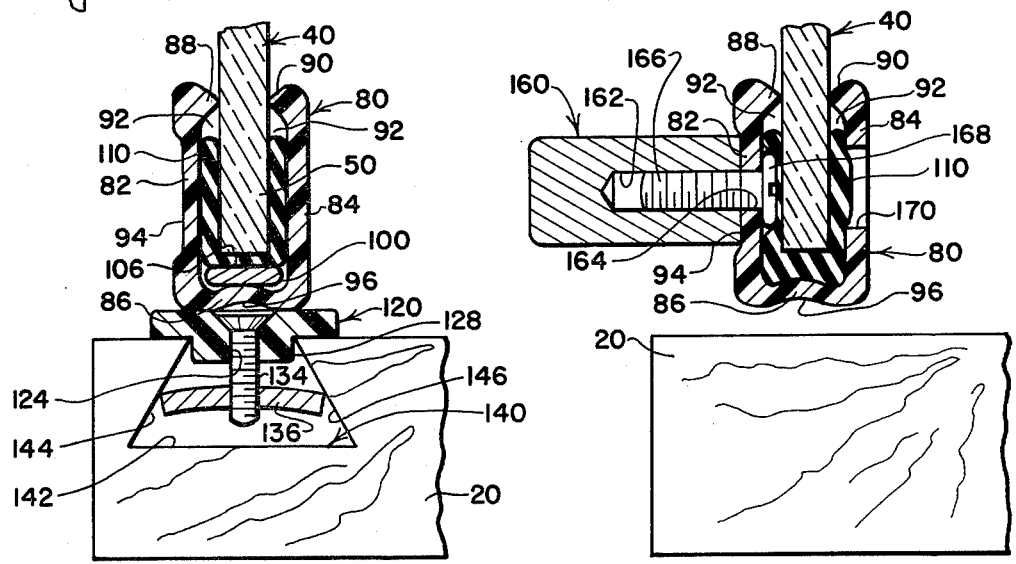
FIGS. 5, 6 and 7 are enlarged sectional views as seen from planes indicated by lines 5—5, 6—6, and 7—7 in FIG. 2; and, FIG. 8 is a sectional view similar to FIG. 7 illustrating the use of a magnetic detent assembly as an alternative to the use of a spring-biased ball detent assembly shown in FIG. 7.

Referring to FIGS. 2 and 5, the panel-engaging member 80 is an elongate member which extends the entire width of the bottom region 50 of the door panel 40. The member 80 has a U-shaped cross section defined by a pair of spaced upstanding leg portions 82, 84 having their lower ends interconnected by a transversely extending base portion 86. Upper ends of the leg portions 82, 84 have inwardly extending formations 88, 90 which clampingly engage the lower end region 50 of the door panel 40. The portions 82, 84, 86 cooperate with the lower end region 50 to define a U-shaped channel 92 between the end region 50 and the portions 82, 84, 86. A relatively wide groove or recess 94 is formed in the outer surface of the front leg portion 82. A narrower groove or recess 96 is formed in the outer surface of the base portion 86. In preferred practice, the panel-engaging member 80 is formed as a rigid extrusion of opaque polyvinyl chloride plastics material.

Referring to FIGS. 2-5, the projection-defining member 100 is formed from corrosion resistant steel and is of L-shape. The member 100 has a cylindrical stem portion 102 with a flattened, transversely extending end portion 104. The end portion 104 is positioned in the U-shaped channel 92 between the base portion 86 and the lower end region 50 of the door panel 40 and has a flat surface 106 facing toward the lower end region 50. The cylindrical stem portion 102 extends through a hole 108 formed in the base portion 86. The stem portion 102 provides a depending projection extending substantially within the plane of the door panel 40 for defining the lower end of a pivot axis of the door panel 40. As will be appreciated, an identical projection-defining member 100 is provided atop the upper end region 60 of the door panel 40 for defining the other end region of a common pivot axis of the door panel 40.

Figure 4:
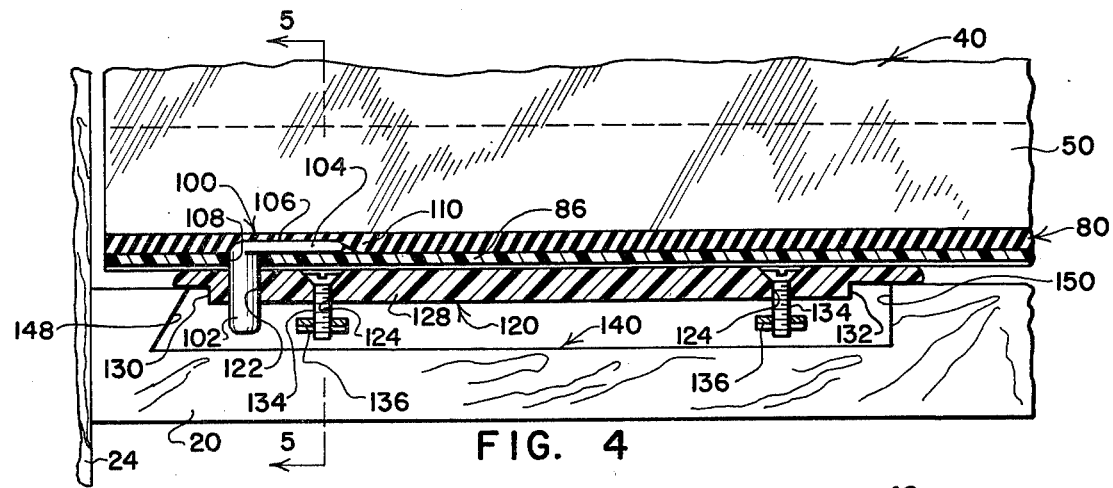
FIG. 4 is an enlarged sectional view of assembled components of the mounting system utilized to pivotally mount the lower end region of the left glass door panel, as seen from a plane indicated generally by a line 4—4 in FIG. 3.

Referring to FIG. 4, while the flattened end portion 104 of the projection-defining member 100 extends rightwardly in conjunction with the mounting of the lower end region 50 on the shelf 20, it should be understood that the projection-defining member (not shown) which is utilized in conjunction with the pivotal mounting of the upper end region 60 on the shelf, has its flattened end portion (not shown) extending leftwardly. By arranging the flattened end portions 104 of the members 100 to extend in opposite directions (with the lower flattened end portion 104 extending toward the center of gravity of the door panel 40 and the upper flattened end portion extending away from the center of gravity), the moment forces imposed on the projection-defining members 100 by the weight of the door panel 40 are better transmitted to the projection-defining members 100.

Referring to FIG. 5, in preferred practice, a resilient liner 110 is provided within the U-shaped channel 92. The liner 110 is interposed between the flat surface 106 of the projection-defining member 100 and the lower end region 50 of the door panel 40. The resilient liner 110 preferably takes the form of a commercially available foam-base tape material which is adhesively coated on its inner and outer surfaces to provide a bond between itself and the components it engages. The resilient liner tape 110 not only serves the function of shielding the lower end region 50 of the glass door panel 40 from direct contact with such metal components as the projection-defining member 100, but also serves to retain in position the components it engages.

Figure 3:
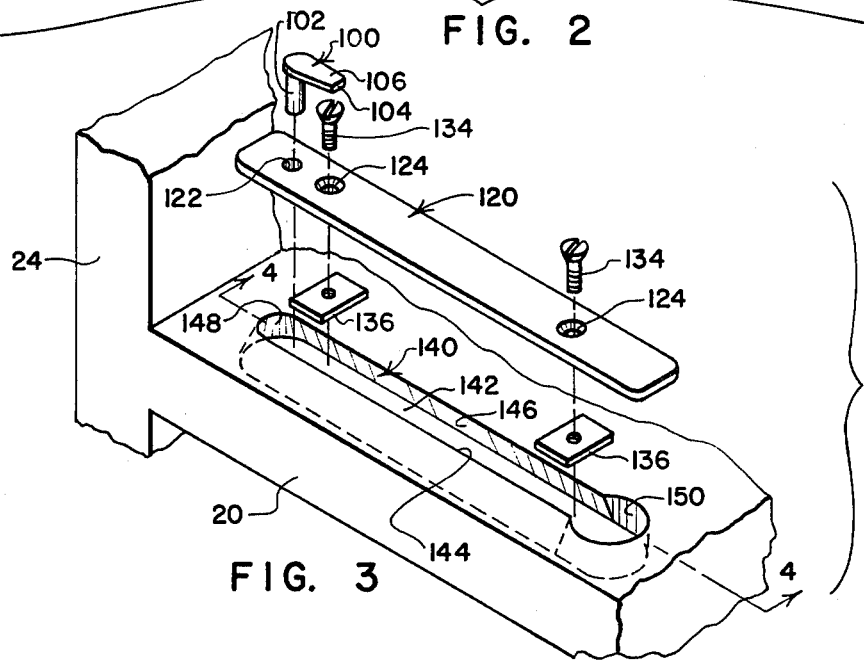
FIG. 3 is an exploded perspective view of selected portions of a mounting system utilized to pivotally mount the lower end region of the left glass door panel.

Referring to FIGS. 3-5, the projection receiving member 120 is of elongate, generally rectangular configuration and is preferably formed from a plastics material such as opaque, high impact styrene. A hole 122 is provided through the body of the member 120 for journaling the projection stem portion 102. Two mounting holes 124 are also formed through the body of the member 120. The member 120 has an elongate depending portion 128 configured to be received within the slot 140. The depending portion 128 is located substantially centrally with respect to the width and length of the member 120 and has ends 130, 132 which allow a substantial amount of play between opposite ends of the slot 140 to permit the adjustable positioning of the projection-journaling hole 122 with respect to the shelf member 20. Threaded fasteners 134 extend through the mounting holes 124 and are threadably received by a pair of generally rectangular nuts 136.

Referring to FIGS. 3-5, the elongate slot 140 has a bottom wall 142. Inclined sidewalls 144, 146 extend along a majority of the length of the slot 140 to define an undercut slot portion. The left end of the slot 140, as viewed in FIGS. 3 and 4, is defined by a tapered, curved end wall 148. The right end of the slot 140, as viewed in FIGS. 3 and 4, is defined by a generally circular end wall 150. The circular end wall 150 provides a slot portion which is not undercut and which may be utilized as a passage for the introduction of the rectangular nuts 136 into the undercut portion of the slot 140. The rectangular nuts 136 are configured such that, when they are in position in the undercut portion of the slot 140 and when the fasteners 134 are tightened, the nuts 136 are drawn into clamping engagement with the inclined sidewalls 144, 146, as best seen in FIG. 5.

The referenced Undercut Slot Patent discloses in detail how an undercut slot such as the slot 140 may be formed using a conventional rotary dovetail cutter, and the disclosure of this patent is incorporated herein by reference. As is described in detail in the referenced Undercut Slot Patent, a rotary dovetail cutter can be positioned with its axis of rotation extending substantially perpendicularly to the plane of the shelf member 20 and can be moved axially to effect the formation of the cylindrical end wall 150. Once the cylindrical end wall 150 has been formed by the cutter, the cutter can be moved longitudinally with respect to the shelf member 20 to form the undercut portion of the slot 140. Longitudinal movement of the cutter is continued until the cutter reaches a position where the tapered curved end wall 148 is formed, whereafter the cutter is moved longitudinally back through the slot 140 and is removed through the non-undercut portion of the slot defined by the end wall 150.

Referring to FIGS. 1, 2 and 6, a conventional U-shaped handle is mounted on the leg portion 82 of the panel-receiving member 80. The handle 160 has threaded holes 162 formed in its opposite end regions. Aligned holes 164 are formed through the leg portion 82. Threaded fasteners 166 extend through the holes 164 and are threaded into the holes 162 to retain the handle 160 in place on the panel-receiving member 80. The threaded fasteners 166 have heads 168 positioned in the U-shaped channel 92. The resilient liner 110 extends between the heads 168 and the lower end region 50 of the door panel 40. In preferred practice, the handle 160 is formed from metallic material and has a width which permits it to be positioned within the recess 94 formed in the leg portion 82. In order to facilitate the insertion of the threaded fasteners 166 through the holes 164, aligned holes 170 may be provided through the leg portion 84.

Figures 7, 8:
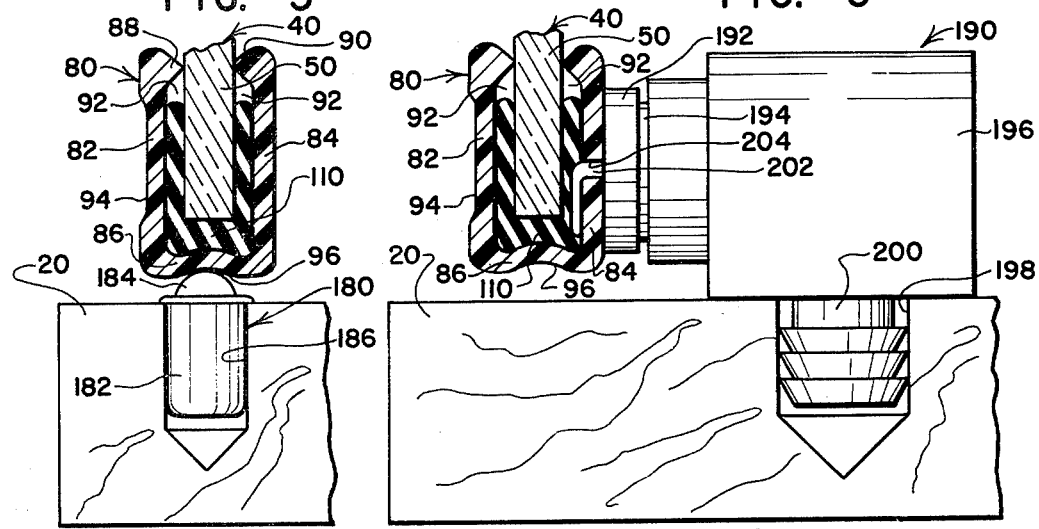

Referring to FIGS. 2 and 7, a detent element, indicated generally by the numeral 180, is carried by the shelf member 20. In preferred practice, the detent element 180 comprises a commercially available assembly including a generally cylindrical housing 182 which carries a ball-shaped detent member 184 and which houses a compression coil spring (not shown) for biasing the ball-shaped detent member 184 toward a projected position extending beyond the upper end of the housing 182. A hole 186 is drilled in the shelf member 20 and the housing 182 is press-fitted into the hole 186. The hole 186 is positioned such that, when the door panel 40 is in its closed position, the detent member 180 will underlie the panel-receiving member 80 with its ball-shaped detent element being biased into receiving engagement with the recess 96. By this arrangement, the detent member 180 and the recess 96 cooperate to releasably retain the door panel 40 in its closed position.

Where the relatively simple detent system of FIG. 7 is deemed to be undesirable, an alternate detent system shown in FIG. 8 may be utilized. The system of FIG. 8 includes a commercially available magnetic latch including an assembly 190 carried by the shelf member 20 and a cooperating magnetic receptor plate 192 carried by the panel-receiving member 80. The assembly 190 includes a magnet 194 supported by a housing 196. A hole 198 is drilled in the shelf member 20 and a projecting portion 200 of the housing 196 is press-fitted into the hole 198. The receptor plate 192 is provided with a nail-like mounting projection 202 which extends through a hole 204 formed in the leg portion 84. The nail-like mounting projection 202 is clinched along the inner surface of the leg portion 84 to securely retain the receptor plate 192 in place on the leg portion 84. The resilient liner 110 is interposed between the clinched projection 202 and the lower end region 50 of the door panel 40.

While the system of the present invention is particularly well adapted for use with glass door panels, it should be appreciated that this system may be used with door panels formed from other transparent materials and from door panels formed with non-transparent materials. While the adjustable projection-receiving member 120 may be utilized in the mounting of both the lower and upper end regions 50, 60 of the door panel 40, it will be appreciated that a substantially simpler, non-adjustable projection-receiving formation may be utilized at either or both of these locations. By way of example, holes may simply be drilled in the shelf members 20, 22 to receive the cylindrical stems 102 of the projection-defining members 100.

Although the invention has been described in its preferred form with a certain degree of particularity, it is understood that the present disclosure of the preferred form has been made only by way of example and numerous changes in the details of construction and the combination and arrangement of parts may be resorted to without departing from the spirit and scope of the invention as hereinafter claimed. It is intended that the patent shall cover, by suitable expression in the appended claims, whatever features of patentable novelty exist in the invention disclosed.

What is claimed is:

1. A system for mounting opposed ends of a door panel between a pair of frame members for pivotal movement of the door panel relative to the frame members, comprising:
    (a) a pair of panel-engaging members each having a U-shaped cross section defined by a pair of spaced leg portions interconnected by a base portion and each being configured to receive a separate one of the door panel ends between its leg portions, the leg portions having parts which clampingly engage the door panel end received therebetween without the need for fasteners to penetrate or extend through the panel, the leg portions being of elongate configuration and each having first and second end regions with the first end regions of both legs being interconnected by the associated base portion, and the parts which clampingly engage the door panel end being provided near the second end regions of the legs;
    (b) each panel-engaging member cooperating with the panel end received therein to define a substantially U-shaped channel extending between such parts of the panel-engaging member as do not clampingly engage its associated panel end and the door panel end;
    (c) a resilient liner positioned in the U-shaped channel intermediate the base portion and that portion of the door panel end opposite the base portion;
    (d) a pair of elongate projection means each extending from a separate one of the base portions for defining a pivot axis of the door panel; and,
    (e) a pair of projection-receiving means each being provided on a separate one of the frame members for journaling a separate one of the projection means to mount the door panel on the frame members for movement about the pivot axis between open and closed positions.

2. The system of claim 1 wherein the resilient liner substantially fills the U-shaped channel and engages both the door panel end and interior surfaces of the panel-engaging member.

3. The system of claim 2 wherein the resilient liner is bonded to the panel and to the panel-engaging member.

4. The system of claim 1 wherein the elongate projection means extend through an opening in the base portion and bear against the resilient liner.

5. The system of claim 1 wherein:
    (a) each of the elongate projection means includes a generally cylindrical stem having an integrally formed mounting portion:
    (b) the mounting portion is positioned in the channel defined between its associated panel-receiving member and door panel end; and,
    (c) the stem extends through a hole formed in the base portion of the associated panel-engaging member.

6. The system of claim 5 wherein the mounting portion defines a substantially flat surface facing toward the associated door panel end.

7. The system of claim 6 wherein a resilient liner material is interposed between the flat surface and the associated door panel end.

8. The system of claim 1 wherein:
    (a) a selected one of the panel-engaging members is provided with a handle mounted thereon for facilitating movement of the door panel relative to the frame members;
    (b) the handle is positioned alongside one of the leg portions of the selected panel-engaging members;
    (c) at least one hole is formed through the one leg portion adjacent the handle; and,
    (d) a headed fastener means has its head positioned in the channel and has a shank portion extending through the hole and into connecting engagement with the handle for mounting the handle on the selected panel-engaging member.

9. The system of claim 8 wherein a resilient liner material is interposed between the fastener head and the associated panel end.

10. The system of claim 1 wherein:
    (a) a selected one of the panel-engaging members is provided with a first detent element mounted thereon for cooperating with a second detent element mounted on one of the frame members to releasably retain the door panel in a closed position; and,
    (b) the first detent element being secured to the selected panel-engaging member by means of a retaining formation which extends through a hole formed in the selected panel-engaging member and into the channel.

11. The system of claim 10 wherein a resilient liner material is interposed between the retaining formation and the associated panel end.

12. The system of claim 1 wherein the door panel is formed from transparent material.

13. The system of claim 1 wherein the door panel is formed of glass.

14. The system of claim 1 wherein at least one of the projection-receiving means includes a bearing structure movably mounted on its associated frame member for adjustably positioning the pivot axis relative to the associated frame member.

15. The system of claim 14 wherein the bearing structure is of elongate configuration and has an elongate portion extending into an elongate slot formed in the associate frame member.

16. The system of claim 15 wherein the elongate slot has an undercut cross section along at least a part of its length, and the bearing structure is provided with mounting means extending into the undercut part of the slot for releasably clamping the bearing structure in selected positions on the associated frame member.

17. The system of claim 14 wherein the elongate slot has a part which is not undercut and the mounting means is configured to be introduced into the undercut part of the slot by first being inserted into the slot at the location of the non-undercut part and then being moved longitudinally within the slot to the location of the undercut part.

18. The system of claim 1 wherein the panel-engaging members are of substantially identical elongate configuration and have substantially constant cross sectional configurations along their lengths.

19. The system of claim 18 wherein at least one of the leg portions of each of the panel-engaging members is provided with a recess on its outer surface, and a selected one of the panel-engaging members is provided with a handle mounted thereon and extending into the recess.

20. The system of claim 18 wherein each of the base portions of the panel-engaging members is provided with a recess in its outer surface, and a selected one of the frame members carries a detent element configured to engage the recess when the door panel is closed to releasably retain the door panel in a closed position.

21. The system of claim 18 wherein the panel-engaging members are formed as extrusions of plastics material.

22. The system of claim 1 additionally including a handle formation provided on a selected one of the panel-engaging members for facilitating opening and closing of the door panel, and a detent formation provided on a certain one of the panel-engaging members for cooperation with a detent element carried on one of the frame members to releasably retain the door panel in its closed position.

23. A method of mounting opposed ends of a door panel between a pair of frame members for pivotal movement of the door panel relative to the frame members between open and closed positions, the method comprising the steps of:
(a) disposing the door panel ends between portions of a panel-engaging member, the panel-engaging member having a U-shaped cross section defined by a pair of spaced leg portions interconnected by a base portion, the leg portions clampingly engaging the door panel ends at a location remote from the base portion, the door panel ends otherwise not contacting the panel-engaging member to define a U-shaped channel therebetween;
(b) interposing a resilient liner in the U-shaped channel between the base portion and that portion of the door panel end closest to the base portion;
(c) extending an elongate projection means from each base portion to define a pivotal axis of the door panel; and,
(d) journaling each projection means in a projection-receiving means secured to the frame members to pivotally mount the door panel on the frame members.

24. The method of claim 23 wherein the panel-engaging members are formed as elongate extrusions of a plastics material having a substantially uniform cross sectional configuration along their lengths.

25. The method of claim 23 additionally including the step of mounting a handle on a selected one of the panel-engaging members to facilitate pivoting the door panel between open and closed positions.

26. The method of claim 23 additionally including the steps of providing a first detent element on a selected one of the panel-engaging members and providing a second detent element on one of the frame members, the detent elements being arranged to cooperate with each other to releasably retain the door panel in its closed position.

27. The method of claim 26 wherein:
(a) the step of providing a first detent element includes the step of providing a recess on the base portion of the selected panel-engaging member; and,
(b) the step of providing a second detent element includes the step of providing a detent member which is extensible into engagement with the recess when the door panel is closed to releasably retain the door panel in its closed position.

28. The method of claim 23 wherein the step of providing a pair of projection means includes the step of providing a selected one of the frame members with a movably mounted bearing structure configured to journal its associated projection means and to adjustably position the pivot axis relative to the selected frame member.

29. The method of claim 28 wherein the step of providing a selected one of the frame members with a movably mounted bearing structure additionally includes the steps of:
(a) forming an elongate slot in the selected frame member; and,
(b) providing the bearing structure with mounting means which extends into and clampingly engages such parts of the selected frame member as define the slot to releasably retain the bearing structure in position on the selected frame member.

30. The method of claim 29 wherein the step of forming an elongate slot includes the step of forming at least a portion of the slot such that it has an undercut configuration, and the step of providing mounting means includes the step of positioning the mounting means in the undercut slot portion.

31. The method of claim 30 wherein the step of forming an elongate slot additionally includes the step of forming another portion of the slot such that it is not undercut, and the step of positioning the mounting means includes the steps of inserting the mounting means into the slot through the non-undercut portion followed by moving the mounting means longitudinally within the slot to position the mounting means in the undercut slot portion.

32. The method of claim 31 wherein the step of forming the slot is effected using a rotary dovetail cutter which is first brought into engagement with the selected frame member to form the non-undercut slot portion and which is then moved longitudinally with respect to the selected frame member to form the undercut portion of the slot.

33. A system for mounting opposed ends of a door panel between a pair of frame members for pivotal movement of the door panel relative to the frame members, comprising:
 (a) a pair of panel-engaging members each having a U-shaped cross section defined by a pair of spaced leg portions interconnected by a base portion and each being configured to receive a separate one of the door panel ends between its leg portions;
 (b) a pair of elongate projection means each extending from a separate one of the base portions for defining a pivot axis of the door panel; and,
 (c) a pair of elongate projection-receiving means each being movably mounted to a separate one of the frame members for journaling a separate one of the projection means to mount the door panel on the frame members for movement about the pivot axis between open and closed positions and for adjusting the location of the pivot axis relative to the associated frame member, the projection-receiving means being adjustably mounted to the frame member by means of:
  (i) an elongate slot formed in the frame member;
  (ii) an undercut portion of the slot along at least a part of the length of the slot;
  (iii) a portion of the slot which is not undercut;
  (iv) an elongate portion of the projection-receiving means extending into the elongate slot; and
  (v) a mounting means extending from the projection-receiving means into the undercut portion of the slot for releasably clamping the projection-receiving means in selected positions on the frame member, the mounting means being introduced into the undercut part of the slot by first being inserted into the slot at the location of the non-undercut part and then being moved longitudinally within the slot to the location of the undercut part.

34. A method of mounting opposed ends of a door panel between a pair of frame members for pivotal movement of the door panel relative to the frame members between open and closed positions, the method comprising the steps of:
 (a) providing a pair of panel-engaging members each having a U-shaped cross section defined by a pair of spaced leg portions interconnected by a base portion and each being configured to receive a separate one of the door panel ends between its leg portions;
 (b) providing a pair of elongate projection means each extending from a separate one of the base portions to define a pivot axis of the door panel;
 (c) providing a pair of elongate projection-receiving means each being adjustably mounted to a separate one of the frame members for journaling a separate one of the projection means and for adjusting the location of the pivot axis relative to the associated frame member;
 (d) forming an elongate slot in the frame members, the slot including an undercut portion and a portion not having an undercut;
 (e) providing the projection-receiving means with mounting means which extend into and clampingly engage the undercut portion of the slot;
 (f) positioning the mounting means in the slot by inserting the mounting means into the non-undercut portion of the slot followed by moving the mounting means longitudinally within the slot to position the mounting means in the undercut portion of the slot;
 (g) inserting each of the panel ends between the leg portions of a separate one of the panel engagement members to interconnect the panel engaging members and the door panel; and,
 (h) journaling the projection means in the projection-receiving means to pivotally mount the door panel on the frame members.

35. The method of claim 34 wherein the step of forming the slot is effected using a rotary dovetail cutter which is first brought into engagement with the selected frame member to form the non-undercut slot portion and which is then moved longitudinally with respect to the selected frame member to form the undercut portion of the slot.

* * * * *